United States Patent
Loy et al.

(10) Patent No.: US 8,001,256 B2
(45) Date of Patent: Aug. 16, 2011

(54) SYSTEM WITH MULTIPLE NETWORK PROTOCOL SUPPORT

(75) Inventors: Dietmar Loy, Sausalito, CA (US); Edward L Koch, San Rafael, CA (US)

(73) Assignee: Lawrence Silverman, Newtown Square, PA (US), Trustee for GridPlex Networks LLC ( * ) Notice: Subject to any disclaimer, the term of this patent is extended or adjusted under 35 U.S.C. 154(b) by 0 days.

(21) Appl. No.: 12/414,001

(22) Filed: Mar. 30, 2009

(65) Prior Publication Data
US 2010/0036961 A1   Feb. 11, 2010

Related U.S. Application Data

(63) Continuation of application No. 11/051,286, filed on Feb. 4, 2005, now abandoned, which is a continuation of application No. 09/821,923, filed on Mar. 30, 2001, now abandoned.

(51) Int. Cl.
*G06F 15/173* (2006.01)
*G06F 15/16* (2006.01)
(52) U.S. Cl. .................................. 709/230; 709/223
(58) Field of Classification Search .............. 709/230, 709/223
See application file for complete search history.

(56) References Cited

U.S. PATENT DOCUMENTS

| | | | | |
|---|---|---|---|---|
| 5,142,528 A | * | 8/1992 | Kobayashi et al. | 370/469 |
| 5,642,482 A | * | 6/1997 | Pardillos | 709/222 |
| 6,505,255 B1 | * | 1/2003 | Akatsu et al. | 709/239 |

* cited by examiner

*Primary Examiner* — Larry Donaghue
(74) *Attorney, Agent, or Firm* — Barkume & Assoc. PC; Anthony Barkume

(57) ABSTRACT

The present invention provides a system with multiple network protocol support. The system includes: a first memory, the first memory comprising program instructions for processing upper and lower layers of the network protocol; a first processor, where the first processor processes the upper layers of the network protocol for a data packet according to the program instructions in the first memory; and a second processor, where the second processor processes lower layers of the network protocol for the data packet according to the program instructions in the first memory. When the network protocol is changed, instructions for the new protocol is fetched from a second memory and placed in the first memory. Thus, the hardware of the system need not be redesigned when changing protocols, and the same on-system unit is used to implement each protocol. This increases flexibility, provides cost effectiveness, and increases the reliability of the system.

8 Claims, 4 Drawing Sheets

SYSTEM WITH MULTIPLE NETWORK PROTOCOL SUPPORT

FIELD OF THE INVENTION

The present invention relates to networks, and more particularly to multiple protocol support in networks.

BACKGROUND OF THE INVENTION

FIG. 1 illustrates a conventional network 114. The network 114 includes a plurality of nodes 102, 104, and 106. Each of the nodes 102-106 can be functioning using different protocols. Thus, when a packet is to be exchanged between nodes, the packet must be packed according to the protocol understood by the receiving node, or the receiving node must understand the protocol used by the sending node. Typically, hardware designed specifically for this protocol is used by a processor in the sending or the receiving node to properly pack or unpack the data. However, when either node's protocol changes, the hardware must be redesigned. This is inflexible. Alternately, several hardware units, one for each possible protocol used by a node, may be used. Conventionally, this approach requires the hardware units to be external to the processor of the node. This is costly.

Accordingly, there exists a need for an improved system with multiple network protocol support. The system should not require hardware redesign when a protocol is changed and should be cost effective to implement. The present invention addresses such a need.

SUMMARY OF THE INVENTION

The present invention provides a system with multiple network protocol support. The system includes: a first memory, the first memory comprising program instructions for processing upper and lower layers of the network protocol; a first processor, where the first processor processes the upper layers of the network protocol for a data packet according to the program instructions in the first memory; and a second processor, where the second processor processes lower layers of the network protocol for the data packet according to the program instructions in the first memory. When the network protocol is changed, instructions for the new protocol is fetched from a second memory and placed in the first memory. Thus, the hardware of the system need not be redesigned when changing protocols, and the same on-system unit is used to implement each protocol. This increases flexibility, provides cost effectiveness, and increases the reliability of the system.

DETAILED DESCRIPTION

The present invention provides an improved system with multiple network protocol support. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 1:
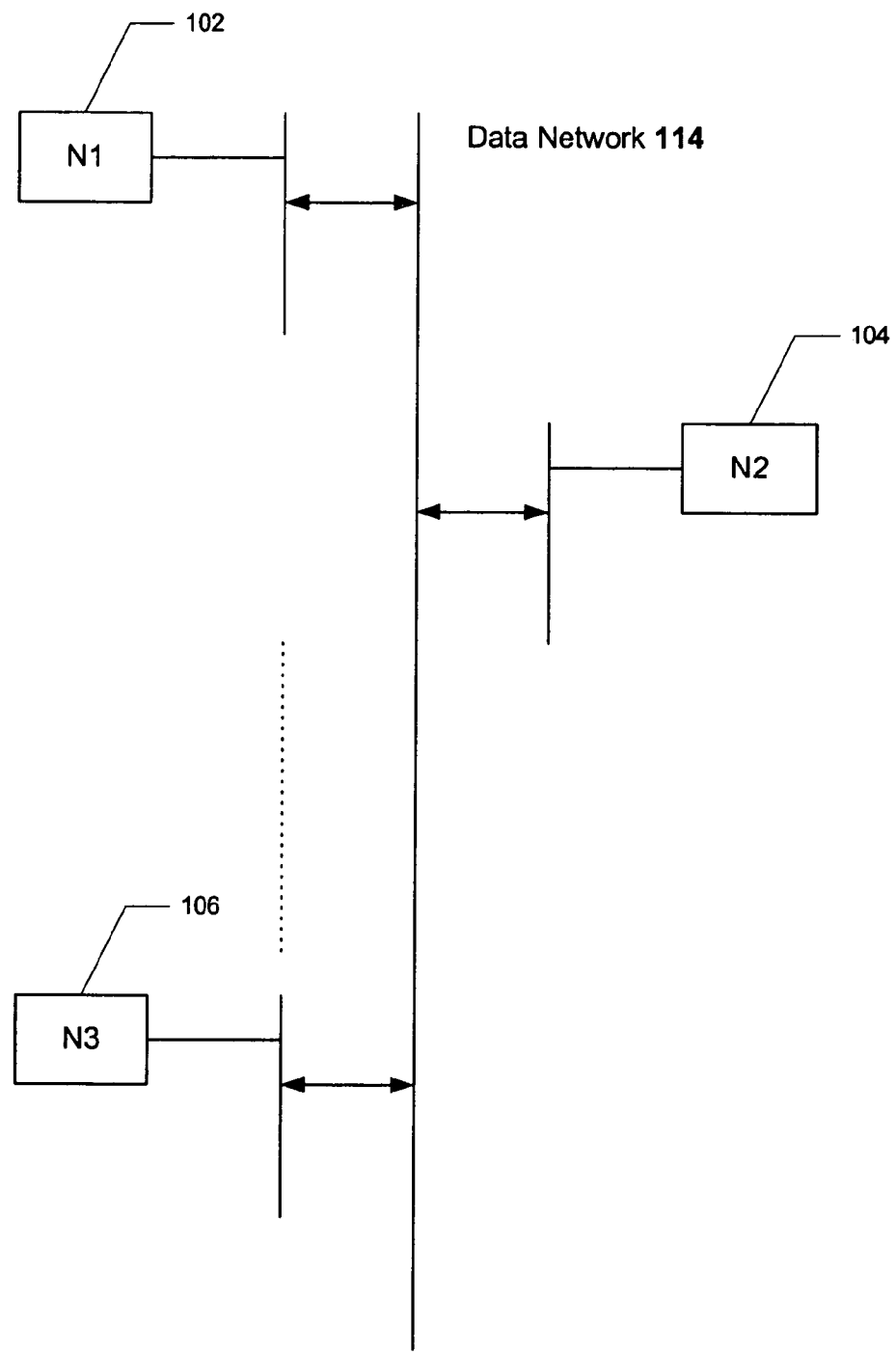
FIG. 1 illustrates a conventional network.
Figure 2:
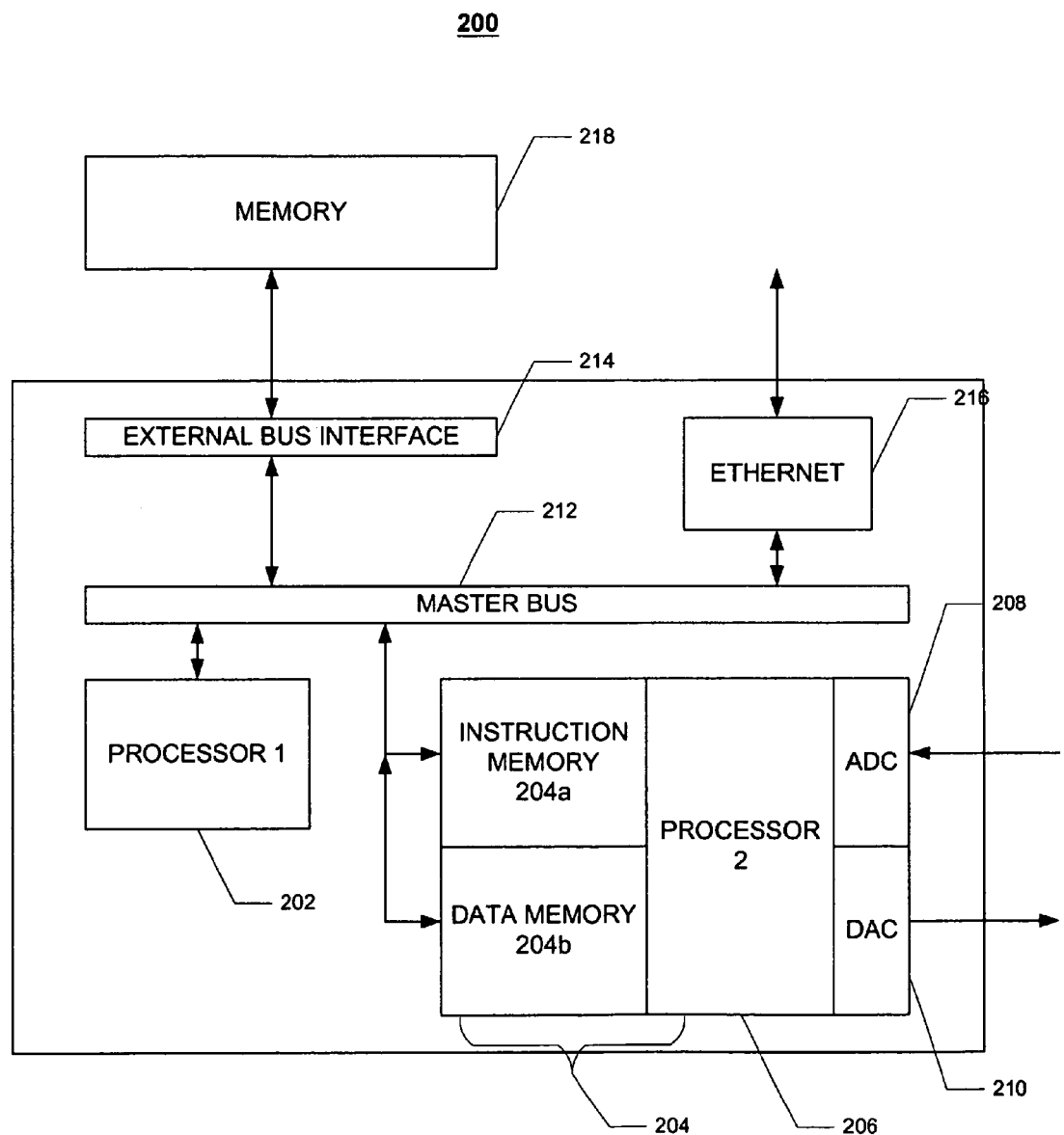
FIG. 2 illustrates a preferred embodiment of a system with multiple network protocol support in accordance with the present invention.

FIG. 2 illustrates a preferred embodiment of a system with multiple network protocol support in accordance with the present invention. The system 200 comprises a first processor 202, a dual port memory 204, a second processor 206, an analog-to-digital converter (ADC) 208, and a digital-to-analog converter (DAC) 210. The dual port memory 204 comprises an instruction memory 204a and a data memory 204b. The system 200 may also comprise a master bus 212 through which the elements of the system 200 may communicate. An external bus interface 214 provides communication between the system 200 and external elements, such as an external memory 218. The system 200 may also communicate with a network, such as an Ethernet 216. The system in accordance with the present invention may be used in any network in which data packets are exchanged between nodes. The nodes may include gateways, sensors, actuators, or any other similar-typed device.

The first processor 202 processes the upper layers of a network protocol for a data packet. Typically, the upper layers includes layers three through seven of a conventional seven-layer protocol. The seven-layer protocol is well known in the art and will not be further described here. In the case of an incoming data packet, the processor 202 unpacks layers three through seven of the network protocol from an interim data stored in the data memory 204b. In the case of an outgoing data, the processor 202 packs layers seven through three of the network protocol and stores the interim data in the data memory 204b.

The instruction memory 204a of the dual port memory 204 stores the instructions for a particular network protocol. Incoming and outgoing data packets and data are processed according to the instructions stored here. The data memory 204b of the dual port memory 204 stores interim data in the process of being packed or unpacked.

The second processor 206 processes the lower layers of the network protocol for a data packet. Typically, the lower layers includes layers one (physical layer) and two (link layer) of a conventional 7-layer protocol. In the case of an incoming data packet, the processor 206 unpacks layers one and two of the network protocol for the packet and stores the interim data in the data memory 204b. In the case of an outgoing data, the processor 206 fetches an interim data from the data memory 204b and packs layers one and two of the network protocol for the data.

The ADC 208 receives an incoming data packet from a media, converts it into a digital signal, and forwards this digital signal to the second processor 206. The DAC 210 receives an outgoing data packet from the second processor 206, converts the packet into an analog signal, and sends the packet along the media.

An important feature of the system 200 in accordance with the present invention is the fact that the first processor 202 is used to process the upper layers of the network protocol while a second and separate processor 206 is used to process the lower layers of the network protocol. In conventional systems, the upper layers are processed using software. However, to process the lower layers, conventional systems use hardware specifically designed for the particular protocol. This is necessary because layer one and two of the protocol stack typically require tight timing parameters and the processing of analog signals. This hardware must be redesigned whenever the protocol is changed. Otherwise, several hardware units external to the system, one for each possible protocol, is used. But with the system 200 in accordance with the present invention, the lower protocol layers are processed using digital signal processing techniques implemented in software. The software instructions for a particular protocol is stored in the instruction memory 204a. Whenever the protocol is to be changed, the first processor 202 fetches the instructions for the new protocol from a source, such as an external memory 218, and places these instructions in the instruction memory 204a. During the processing of data packets, the first 202 and the second 206 processors implement the instructions in the instruction memory 204a. In this manner, the hardware of the system need not be redesigned when changing protocols. In addition, the same on-system unit is used to implement each protocol, eliminating the need for external hardware units. This increases the flexibility of the system 200, is more cost effective, and increases the reliability of the system 200.

Figure 3:
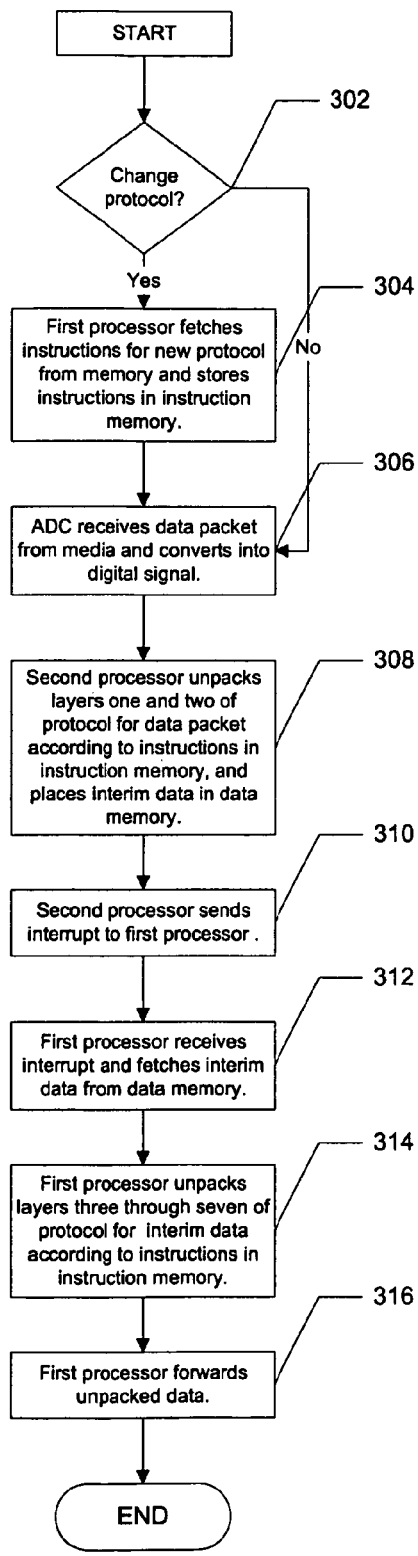
FIG. 3 is a flow chart illustrating the receiving of a data packet by the system with multiple network protocol support in accordance with the present invention.

FIG. 3 is a flow chart illustrating the receiving of a data packet by the system with multiple network protocol support in accordance with the present invention. In the preferred embodiment, upon power up of the system 200, the first processor 202 fetches instructions for a protocol from the memory 218 and stores them in the instruction memory 204a. Whenever the network protocol needs to be changed, via step 302, then the first processor 202 fetches the instructions for the new protocol from the memory 218 and stores them in the instruction memory 204a, via step 304. The ADC 208 receives a data packet from the media and converts the packet into a digital signal, via step 306. The second processor 206 unpacks layers one and two of the network protocol for the packet according to the instructions in the instruction memory 204a, and places the interim data into the data memory 204b, via step 308. The second processor 206 then sends an interrupt 310 to the first processor 202, informing the first processor 202 that an interim data has been stored in the data memory 204b. The first processor 202 receives the interrupt and fetches the interim data from the data memory 204b, via step 312. The first processor 202 then unpacks layers three through seven of the network protocol for the interim data according to the instructions in the instruction memory 204a, via step 314. The first processor 202 then forwards the unpacked data, via step 316. The unpacked data could be forwarded to a memory, such as memory 218, or to an Ethernet 216.

Figure 4:
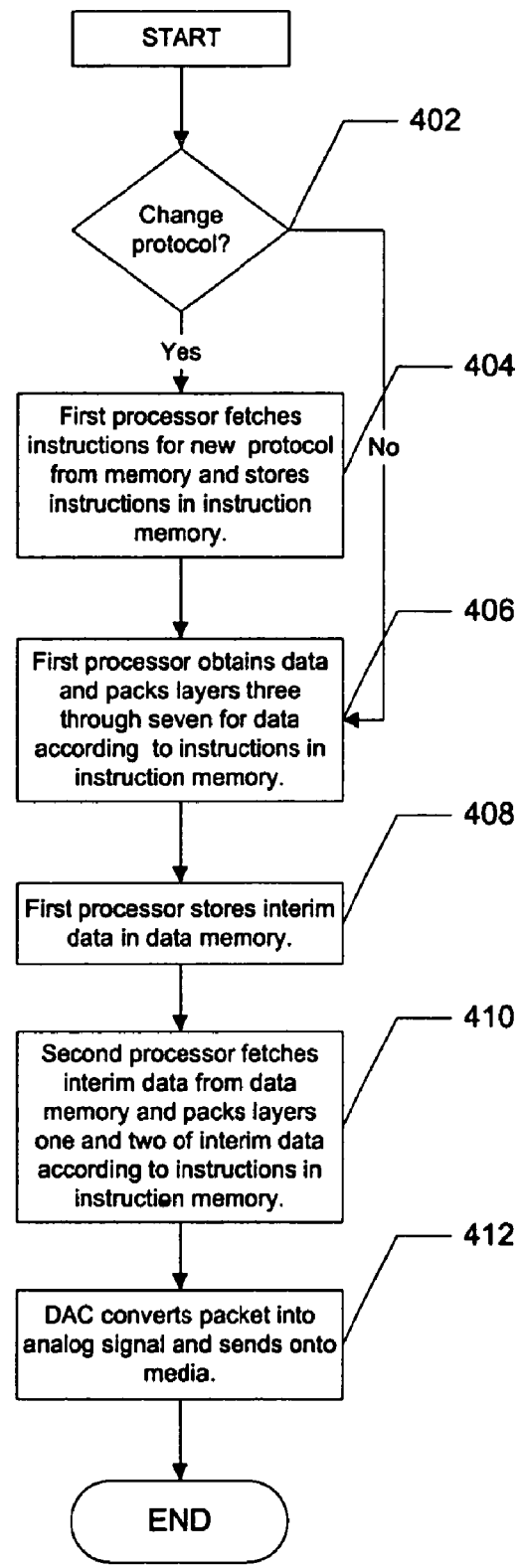
FIG. 4 is a flow chart illustrating the sending of data by the system with multiple network protocol support in accordance with the present invention.

FIG. 4 is a flow chart illustrating the sending of data by the system with multiple network protocol support in accordance with the present invention. Whenever the network protocol needs to be changed, via step 402, the first processor 202 fetches the instructions for the new protocol from the memory 218 and stores them in the instruction memory 204a, via step 404. The first processor 202 obtains the outgoing data and packs layers three through seven of the network protocol for the data according to the instructions in the instruction memory 204a, via step 406. The first processor 202 then stores the interim data in the data memory 204b, via step 408. Next, the second processor 206 fetches the interim data from the data memory 204b and packs layers one and two of the network protocol for the interim data according to the instructions in the instruction memory 204a, via step 410. The DAC 210 then converts the data packet into an analog signal and sends the packet onto the media, via step 412.

An improved system with multiple network protocol support has been disclosed. The system comprises a first processor which processes the upper layers and a second and separate processor which processes the lower layers of a network protocol. When the protocol is changed, the first processor fetches the instructions for the new protocol from a source and places these instructions in an instruction memory. During the processing of data packets, the first and the second processors implement the instructions in the instruction memory. In this manner, the hardware of the system need not be redesigned when changing protocols, and the same on-system unit is used to implement each protocol. This increases flexibility, provides cost effectiveness, and increases the reliability of the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for supporting a network protocol, comprising:
   a first memory, the first memory comprising program instructions for processing upper and lower layers of the network protocol for outgoing data packets and incoming data packets;
   a first processor, wherein the first processor processes the upper layers of the network protocol for an outgoing data packet according to the program instructions in the first memory by packing upper layers of the network protocol for the outgoing data packet by the first processor, resulting in an interim data, and storing the interim data in a data memory; and
   a second processor, wherein the second processor processes lower layers of the network protocol for the outgoing data packet according to the program instructions in the first memory by fetching the interim data from the data memory and packing lower layers of the network protocol for the interim data; and further wherein
   the second processor processes lower layers of the network protocol for an incoming data packet according to the program instructions in the first memory by receiving an incoming data packet from a medium, unpacking lower layers of the network protocol for the incoming data packet, resulting in an interim data, storing the interim data in a data memory, and sending an interrupt to the first processor to inform the first processor that the interim data has been stored in the data memory; and further wherein
   the first processor processes the upper layers of the network protocol for the incoming data packet according to the program instructions in the first memory by fetching, in response to the interrupt, the interim data from the data memory, and unpacking upper layers of the network protocol for the interim data.

2. The system of claim 1, wherein the first memory comprises:
   an instruction memory comprising the program instructions; and
   a data memory.

3. The system of claim 1, further comprising:
an analog-to-digital converter (ADC) coupled to the second processor; and
a digital-to-analog converter (DAC) coupled to the second processor.

4. The system of claim 1, adapted for supporting a plurality of network protocols, further comprising:
a second memory, the second memory comprising sets of program instructions for processing upper and lower layers of a plurality of network protocols, wherein one of the sets of program instructions is stored in the first memory when the network protocol is to be changed.

5. A method for supporting a network protocol, comprising the steps of:
(a) receiving a data packet from a medium;
(b) unpacking lower layers of the network protocol for the data packet by a second processor according to program instructions in memory, resulting in an interim data;
(c) storing the interim data in a data memory;
(d) sending an interrupt from the second processor to a first processor to inform the first processor that the interim data has been stored in the data memory;
(e) the first processor fetching, in response to the interrupt, the interim data from the data memory; and
(f) unpacking upper layers of the network protocol for the interim data by the first processor according to the program instructions in the memory.

6. The method of claim 5, adapted for supporting a plurality of network protocols, further comprising:
(g) determining if the network protocol is to be changed;
(h) fetching program instructions for a new network protocol if the network protocol is to be changed; and
(i) storing the program instructions for the new network protocol in the memory.

7. A method for supporting a network protocol, comprising the steps of:
(a) obtaining a data by a first processor;
(b) packing upper layers of the network protocol for the data by the first processor according to program instructions in a memory, resulting in an interim data;
(c) storing the interim data in a data memory;
(d) fetching the interim data from the data memory by the second processor; and
(e) packing lower layers of the network protocol for the interim data by the second processor according to the program instructions in the memory.

8. The method of claim 7, adapted for supporting a plurality of network protocols, further comprising:
(f) determining if the network protocol is to be changed;
(g) fetching program instructions for a new network protocol if the network protocol is to be changed; and
(h) storing the program instructions for the new network protocol in the memory.

* * * * *